United States Patent
Saxena et al.

(10) Patent No.: US 10,740,507 B2
(45) Date of Patent: Aug. 11, 2020

(54) WIND TURBINE TOWER PLACEMENT AND ORIENTATION

(71) Applicant: General Electric Company, Schenectady, NY (US)

(72) Inventors: Vikas Saxena, Bangalore (IN); Prashanth Kumar Reddy Vaddi, Bangalore (IN); Pranav Soni, Bangalore (IN); Giridhar Nagraj Ron, Bangalore (IN); Mohan Muthu Kumar Sivanantham, Bangalore (IN); Ingo Paura, Meppen (DE)

(73) Assignee: General Electric Company, Schenectady, NY (US)

( * ) Notice: Subject to any disclaimer, the term of this patent is extended or adjusted under 35 U.S.C. 154(b) by 726 days.

(21) Appl. No.: 15/384,605

(22) Filed: Dec. 20, 2016

(65) Prior Publication Data
US 2018/0173821 A1 Jun. 21, 2018

(51) Int. Cl.
| | |
|---|---|
| G06G 7/50 | (2006.01) |
| G06F 30/20 | (2020.01) |
| F03D 13/30 | (2016.01) |
| F03D 9/25 | (2016.01) |
| G06F 119/06 | (2020.01) |

(52) U.S. Cl.
CPC ............ *G06F 30/20* (2020.01); *F03D 9/257* (2017.02); *F03D 13/30* (2016.05); *F05B 2260/84* (2013.01); *G06F 2119/06* (2020.01); *Y02E 10/725* (2013.01)

(58) Field of Classification Search
None
See application file for complete search history.

(56) References Cited

U.S. PATENT DOCUMENTS

| | | |
|---|---|---|
| 8,441,138 B2 | 5/2013 | Gjerlov et al. |
| 2009/0218818 A1* | 9/2009 | Cardinal ............... F03D 7/0284 290/44 |

(Continued)

FOREIGN PATENT DOCUMENTS

| | | |
|---|---|---|
| EP | 2 128 441 A2 | 12/2009 |
| EP | 2574772 A1 | 4/2013 |
| EP | 3 026 587 A1 | 6/2016 |

OTHER PUBLICATIONS

Grant Schmitz Design and Experimental Validation of 328Ft (100m) Tall Wind Turbine Tower Utilizing High Strength and Ultra-High Performance Concrete, Iowa State University, (Year: 2013).*
Hu Improvement of the Structural Response of Steel Tubular Wind Turbine Towers by Means of StiffenersUniversity of Birmingham, School of Civil Engineering, Jun. 2015 (Year: 2015).*

(Continued)

*Primary Examiner* — Rehana Perveen
*Assistant Examiner* — Cuong V Luu
(74) *Attorney, Agent, or Firm* — Dority & Manning, P.A.

(57) ABSTRACT

Systems and methods for planning a wind farm are provided. One example aspect of the present disclosure is directed to a method for planning a wind farm. The method includes determining, by one or more processors, a load for a plurality of wind conditions for a plurality of circumferential sections for a tower of a wind turbine. The method includes accessing, by the one or more processors, a model that predicts wind conditions over a time period. The method includes determining, by the one or more processors, a load sustainment parameter for the plurality of circumferential sections for the predicted wind conditions over the time period.

19 Claims, 6 Drawing Sheets

(56) References Cited

U.S. PATENT DOCUMENTS

| | | | | |
|---|---|---|---|---|
| 2010/0192503 | A1* | 8/2010 | Prasss | F03D 13/10 |
| | | | | 52/651.01 |
| 2011/0142683 | A1* | 6/2011 | Sharples | F03D 1/0608 |
| | | | | 416/244 R |
| 2013/0064663 | A1* | 3/2013 | Loth | F03D 1/0675 |
| | | | | 416/44 |
| 2014/0044541 | A1* | 2/2014 | Dupin De La Gueriviere | |
| | | | | B63B 21/50 |
| | | | | 416/1 |
| 2014/0103665 | A1* | 4/2014 | Von Grunberg | F03D 7/048 |
| | | | | 290/55 |
| 2014/0112777 | A1* | 4/2014 | Kalra | F03D 7/048 |
| | | | | 416/1 |
| 2014/0219795 | A1* | 8/2014 | Honhoff | F03D 7/0204 |
| | | | | 416/1 |
| 2014/0271181 | A1* | 9/2014 | Perley | F03D 7/042 |
| | | | | 416/1 |
| 2016/0025072 | A1* | 1/2016 | Monteiro De Barros | |
| | | | | F03D 80/70 |
| | | | | 415/121.3 |
| 2018/0030750 | A1* | 2/2018 | Ollgaard | E06B 1/6046 |

OTHER PUBLICATIONS

Brusca et al. Wind Turbine Placement Optimization by Means of the Monte Carlo Simulation Method, Modeling and Simulation in EngineeringVol . 2014 Article ID 760934 (Year: 2014).*

Sathe et al. Influence of Atmospheric Stability on Wind Turbine Loads Wind Enrg. 2013, 16, pp. 1013-1032 (Year: 2013).*

Huskey et al. Tower Design Load Verification on a 1-kW Wind Turbine NREL/CP-500-37112, Jan. 2005 (Year: 2005).*

Koukoura Validated Loads Prdiction Models for Offshore Wind Turbines for Enhance Component Reliability DTU Library (Year: 2014).*

Lavassas et al. Analysis and Design of the Prototype of a Steel 1-MW Wind Turbine Tower Engineering Structures 25, 2003, pp. 1097-1106 (Year: 2003).*

Nicholson Design of Wind Turbine Tower and Foundation Systems: Optimization Approach University of Iowa, Iowa Research Online, 2011 (Year: 2011).*

Extended European Search Report and Opinion issued in connection with corresponding EP Application No. 17206632.6 dated May 25, 2018.

* cited by examiner

WIND TURBINE TOWER PLACEMENT AND ORIENTATION

FIELD

The present subject matter relates generally to wind farms.

BACKGROUND

A wind farm can include a plurality of wind turbines. Each of the plurality of wind turbines can include a tower. A tower of a wind turbine can sustain loads from winds. The loads from the winds can limit the useful life of a tower. Placement and orientation of the plurality of wind turbines in the wind farm can influence the load on the plurality of wind turbines.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for planning a wind farm. The method includes determining, by one or more processors, a load for a plurality of wind conditions for a plurality of circumferential sections for a tower of a wind turbine. The method includes accessing, by the one or more processors, a model that predicts wind conditions over a time period. The method includes determining, by the one or more processors, a load sustainment parameter for the plurality of circumferential sections for the predicted wind conditions over the time period.

Another example aspect of the present disclosure is directed to a system for planning a wind farm. The system includes one or more memory devices. The system includes one or more processors. The one or more processors are configured to determine a load for a plurality of wind conditions for a plurality of circumferential sections for a tower of a wind turbine. The one or more processors are configured to access a model that predicts wind conditions over a time period. The one or more processors are configured to determine a load sustainment parameter for the plurality of circumferential sections for the predicted wind conditions over the time period.

Other example aspects of the present disclosure are directed to systems, methods, wind farms, wind turbines, devices, non-transitory computer-readable media for planning a wind farm.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems that can assist in planning the placement, orientation, and/or design of wind turbine towers in a wind farm, for instance, in a computer-implemented wind farm planning tool. A wind farm can include a plurality of wind turbines. A wind turbine can have a tower. According to example aspects of the present disclosure, a tower can be divided into a plurality of circumferential sections. For example, a tower can be divided into 12, 30° circumferential sections. A determination can be made as to a load sustainment parameter for each circumferential section for a plurality of wind directions. The load sustainment parameters determined for the plurality of circumferential sections can be used in determining or planning placement, orientation and/or design of the tower in a wind farm.

In some embodiments, the tower can further be divided by evenly spaced horizontal lines to form cans. For example, a section of the tower from 0 feet to 2 feet can be a first can, a section of the tower from 2 feet to 4 feet can be a second can, and so on. In an embodiment, a determination can be made as to a load sustainment parameter for a plurality of circumferential sections of each can.

In some embodiments, loads can be determined for a plurality of different wind conditions (e.g., wind directions) for each circumferential section of a wind turbine. The determined loads of the circumferential sections can be used with a model that predicts wind conditions over a time period to simulate how the predicted wind conditions will affect the plurality of circumferential sections of the towers over the time period (e.g., the estimated life of the wind turbine tower). In some embodiments, a load sustainment parameter for a circumferential section of a tower can be determined based on the predicted wind conditions and determined loads for the time period. If the determined maximum load sustainment parameter for a circumferential section exceeds a limit, then a planned location and/or arrangement of the wind turbine can be repositioned and/or reoriented, for instance, in a computer-implemented wind farm planning tool.

As used herein, a computer-implemented wind farm planning tool can be any software or other computer implemented tool used to assist in the design of wind farms. A wind farm planning tool can, for instance, allow for a user to place wind turbine towers at various locations in a representation of a geographic area and simulate wind conditions, power generations, and other factors of the wind farm. In some embodiments, the wind farm planning tool can be used to determine loads acting on a wind turbine tower from various wind conditions according to example embodiments of the present disclosure.

The systems and methods according to example aspects of the present disclosure can have a technical effect of increasing the useful life of a plurality of wind turbines by illustrating problematic wind turbine positions and/or orientations in light of predicted wind conditions. In some embodiments, the systems and methods of the present disclosure also provide an improvement to a wind farm. For instance, the methods and systems increase the useful life of a plurality of wind turbines associated with the wind farm by placing and/or designing wind turbine towers using more accurate predictions of load sustainment from wind conditions for each circumferential section of the wind turbine tower.

For example, the systems and methods according to example embodiments of the present disclosure can determine a load for a plurality of wind conditions for a plurality of circumferential sections for a tower of a wind turbine, access a model that predicts wind conditions over a time period, determine a load sustainment parameter for the plurality of circumferential sections for the predicted wind conditions over the time period, and arrange or design a wind turbine (e.g., in a wind farm planning tool) in the wind farm based on the determined load sustainment parameter. This can allow a user to change an orientation and/or a position of a wind turbine before the wind turbine is installed and sustains damaging loads from wind. Additionally, various circumferential locations for placement of, for instance, openings (such as door openings), dents, tower shape, bolt or connections points between tower sections, and other design parameters of a wind turbine tower can be determined based on the determined load sustainment parameters for each circumferential section of the tower.

Figure 1:
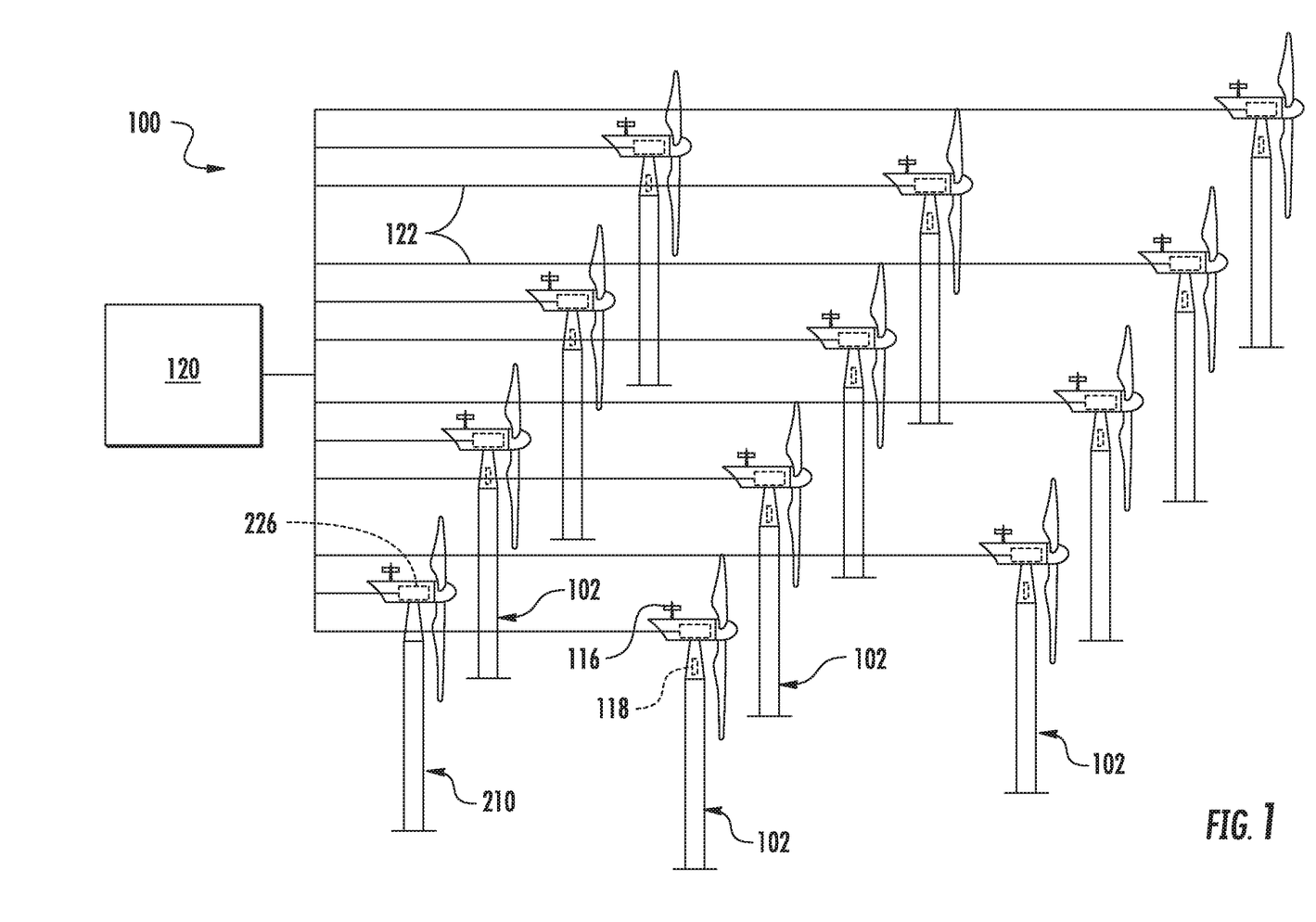
FIG. 1 depicts a wind farm according to example embodiments of the present disclosure.

FIG. 1 depicts a wind farm 100 according to example embodiments of the present disclosure. As shown, the wind farm 100 may include a plurality of wind turbines 102, including the wind turbine 210 described below in reference to FIG. 2, and a farm controller 120. For example, as shown in the illustrated embodiment, the wind farm 100 includes twelve wind turbines, including wind turbine 210. However, in other embodiments, the wind farm 100 may include any other number of wind turbines, such as less than twelve wind turbines or greater than twelve wind turbines. In some embodiments, the controller 226 of the wind turbine 210 may be communicatively coupled to the farm controller 120 through a wired connection, such as by connecting the controller 226 through suitable communicative links 122 (e.g., a suitable cable). Alternatively, the controller 26 may be communicatively coupled to the farm controller 120 through a wireless connection, such as by using any suitable wireless communications protocol known in the art. In addition, the farm controller 120 may be generally configured similar to the controllers 226 for each of the individual wind turbines 102 within the wind farm 100.

In some embodiments, one or more of the wind turbines 102 in the wind farm 100 may include a plurality of sensors for monitoring various operational data of the individual wind turbines 102 and/or one or more wind parameters of the wind farm 100. For example, as shown, each of the wind turbines 102 includes a wind sensor 116, such as an anemometer or any other suitable device, configured for measuring wind speeds or any other wind parameter. For example, in some embodiments, the wind parameters include information regarding at least one of or a combination of the following: a wind gust, a wind speed, a wind direction, a wind acceleration, a wind turbulence, a wind shear, a wind veer, a wake, SCADA information, or similar.

Wind speeds may vary significantly across a wind farm 100. Thus, the wind sensor(s) 116 may allow for the local wind speed at each wind turbine 102 to be monitored. In addition, the wind turbine 102 may also include one or more additional sensors 118. For instance, the sensors 118 may be configured to monitor electrical properties of the output of the generator of each wind turbine 102, such as current sensors, voltage sensors, temperature sensors, or power sensors that monitor power output directly based on current and voltage measurements. Alternatively, the sensors 118 may include any other sensors that may be utilized to monitor the power output of a wind turbine 102. It should also be understood that the wind turbines 102 in the wind farm 100 may include any other suitable sensor known in the art for measuring and/or monitoring wind parameters and/or wind turbine operational data.

Figure 2:
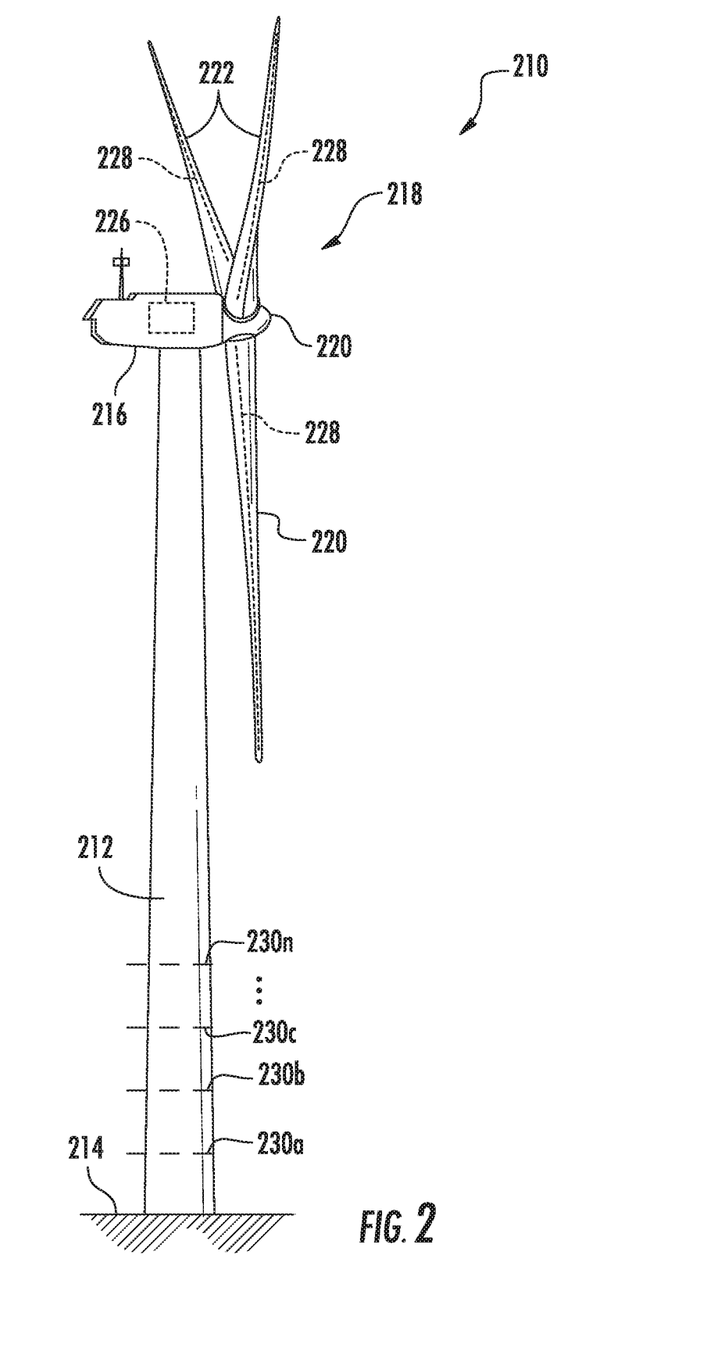
FIG. 2 depicts a wind turbine according to example embodiments of the present disclosure.

FIG. 2 illustrates one example embodiment of a wind turbine 210 according to example aspects the present disclosure. As shown, the wind turbine 210 generally includes a tower 212 extending from a support surface 214, a nacelle 216 mounted on the tower 212, and a rotor 218 coupled to the nacelle 216. The rotor 218 includes a rotatable hub 220 and at least one rotor blade 222 coupled to and extending outwardly from the hub 220. Each rotor blade 222 can include a pitch axis 228. For example, in the illustrated embodiment, the rotor 218 includes three rotor blades 222. However, in an alternative embodiment, the rotor 218 may include more or less than three rotor blades 222. Each rotor blade 222 may be spaced about the hub 220 to facilitate rotating the rotor 218 to enable kinetic energy to be transferred from the wind into usable mechanical energy, and subsequently, electrical energy. For instance, the hub 220 may be rotatably coupled to an electric generator (not shown) positioned within the nacelle 216 to permit electrical energy to be produced.

The wind turbine 210 may also include a wind turbine controller 226 centralized within the nacelle 216. However, in other embodiments, the controller 226 may be located within any other component of the wind turbine 210 or at a location outside the wind turbine. Further, the controller 226 may be communicatively coupled to any number of the components of the wind turbine 210 in order to control the operation of such components and/or to implement a control action. As such, the controller 226 may include a computer or other suitable processing unit. Thus, in several embodiments, the controller 226 may include suitable computer-readable instructions that, when implemented, configure the controller 226 to perform various different functions, such as receiving, transmitting and/or executing wind turbine control signals. Accordingly, the controller 226 may generally be configured to control the various operating modes of the wind turbine 210 (e.g., start-up or shut-down sequences), de-rate or up-rate the wind turbine 210, and/or control various components of the wind turbine 210. For example, the controller 226 may be configured to control the blade pitch or pitch angle of each of the rotor blades 222 (i.e., an angle that determines a perspective of the rotor blades 222 with respect to the direction of the wind) to control the power output generated by the wind turbine 210 by adjusting an angular position of at least one rotor blade 222 relative to the wind. For instance, the controller 226 may control the pitch angle of the rotor blades 222 by rotating the rotor blades 222 about a pitch axis 228, either individually or simultaneously, by transmitting suitable control signals to a pitch drive or pitch adjustment mechanism (not shown) of the wind turbine 210.

The tower 212 can be divided into circumferential sections, described in more detail below in reference to FIG. 3. In an embodiment, the tower 212 can be divided into sections by horizontal lines 230a, 230b, . . . 230n. The sections of the tower 212 defined by the horizontal lines 230a, 230b, . . . 230n can be called cans. Each can of the tower 212 can be divided into circumferential sections, as described in more detail below in reference to FIG. 3.

Figure 3:
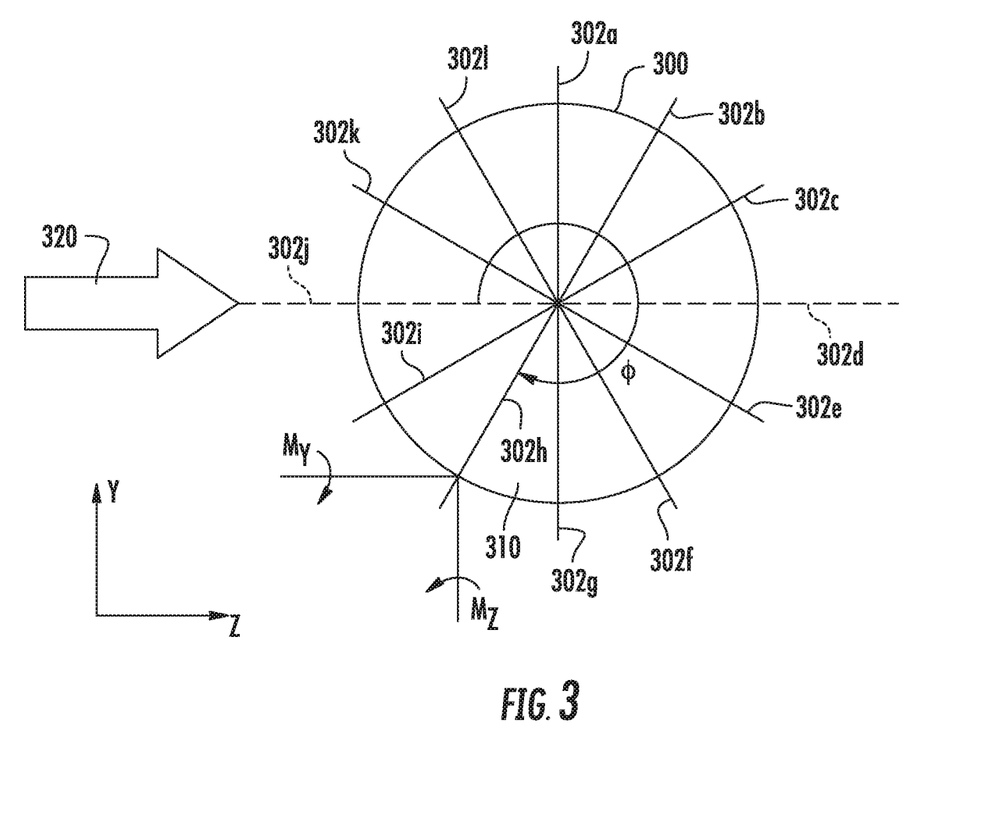
FIG. 3 depicts a cross-sectional view of a wind turbine tower according to example embodiments of the present disclosure.

FIG. 3 depicts a cross-sectional view of a wind turbine tower 300 according to example embodiments of the present disclosure. The wind turbine 300 tower can have a plurality of radial boundaries 302a-302l. Two adjacent radial boundaries, such as radial boundary 302g and radial boundary 302h can define a circumferential section. Although 12 radial boundaries 302a-302l are shown, more or less radial boundaries can be used. Any number of radial boundaries can be used to determine a size of the circumferential sections. For example, 360° can be divided by the number of radial boundaries to determine an arc of each circumferential section. As a further example, when 12 radial boundaries are used, each circumferential section can have an arc of 360° divided by 12, or 30°. In some embodiments, the tower 212 can be divided into circumferential sections. In some embodiments, each can of the tower 212 can be divided into circumferential sections. As will be discussed in detail below, a load sustainment parameter can be determined for each circumferential section based on various wind conditions, such as wind direction 320.

Figure 4:
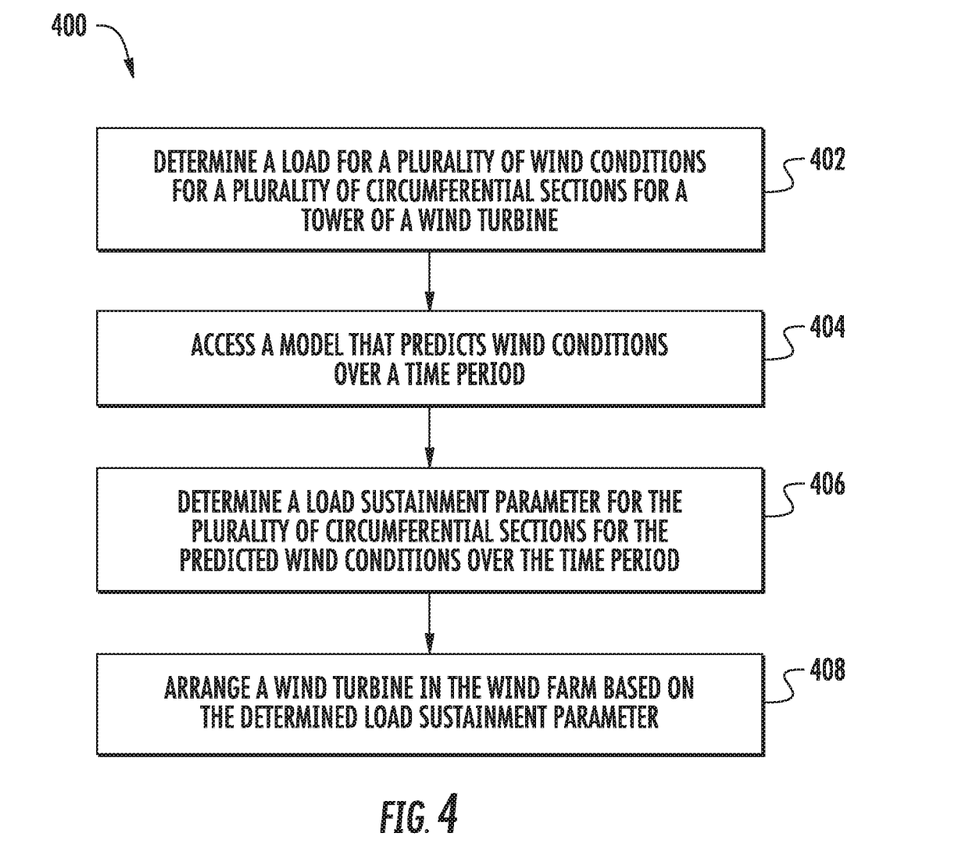
FIG. 4 depicts a flow diagram of an example method according to example embodiments of the present disclosure.

FIG. 4 depicts a flow diagram of an example method 400 for planning a wind farm according to example embodiments of the present disclosure. The method of FIG. 4 can be implemented at least in part using, for instance, the computing system 500 of FIG. 5. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), a load for a plurality of wind conditions for a plurality of circumferential sections for a tower of a wind turbine can be determined. For instance, the computing system 500 of FIG. 6 can determine a load for a plurality of wind conditions for each of a plurality of circumferential sections for a tower of a wind turbine. The plurality of wind conditions can include simulated wind from a plurality of different directions, such as 12 different wind directions about the tower. Any number of different wind directions can be used without deviating from the scope of the present disclosure.

The load for each circumferential section can be determined by determining moments resulting from the wind at the circumferential section. The moments can be in one or more directions. In some embodiments, the moments can be about a y-axis and about a z-axis associated with the wind turbine. For instance as shown in FIG. 3, moment My can be determined about a y-axis for circumferential section 310. Moment Mz can be determined about a z-axis for circumferential section 310. In some embodiments, the load can be determined for a circumferential section using the following:

$$M(Xn) = My \cos(\phi) + Mz \sin(\phi).$$

where $\phi$ is the angle of the circumferential section 310 relative to the wind direction 320.

In some embodiments, the tower of the wind turbine can be divided into a plurality of cans. For instance, the computing system 500 can divide the tower of the wind turbine into a plurality of cans. Each of the cans can include at least one horizontal boundary.

At (404) of FIG. 4, a model that predicts wind conditions over a time period can be accessed. For instance, the computing system 500 of FIG. 6 can access a model that predicts wind conditions over a time period. The model can be based on a directional Weibull model that models a frequency of wind conditions from different directions over a time period (e.g., the lifetime of the wind turbine). Based on the model, an RFC list of moments for each circumferential section can be determined. In some embodiments, the RFC list can be in the form of Markov matrices.

At (406), a load sustainment parameter for the plurality of circumferential sections can be determined for the predicted wind conditions over the time period (e.g., lifetime of the wind turbine tower). The load sustainment parameter can be a fatigue load experienced by the circumferential section over the time period. For instance, the computing system 500 can determine a load sustainment parameter for each of the plurality of circumferential sections for the predicted wind conditions over the time period. In some embodiments, determining the load sustainment parameter for the plurality of circumferential sections for the predicted wind conditions over the time period can include determining a load sustainment parameter for each circumferential section of each can.

In some embodiments, the load sustainment parameter can be calculated based at least in part on the RFC list determined using the model. In some embodiments, the load sustainment parameter can be determined as a sum of all loads over the time period taking into account of a probability of wind occurrence of the time period. The load sustainment parameter can be representative of a fatigue load for each circumferential section of the wind turbine tower.

Figure 5:
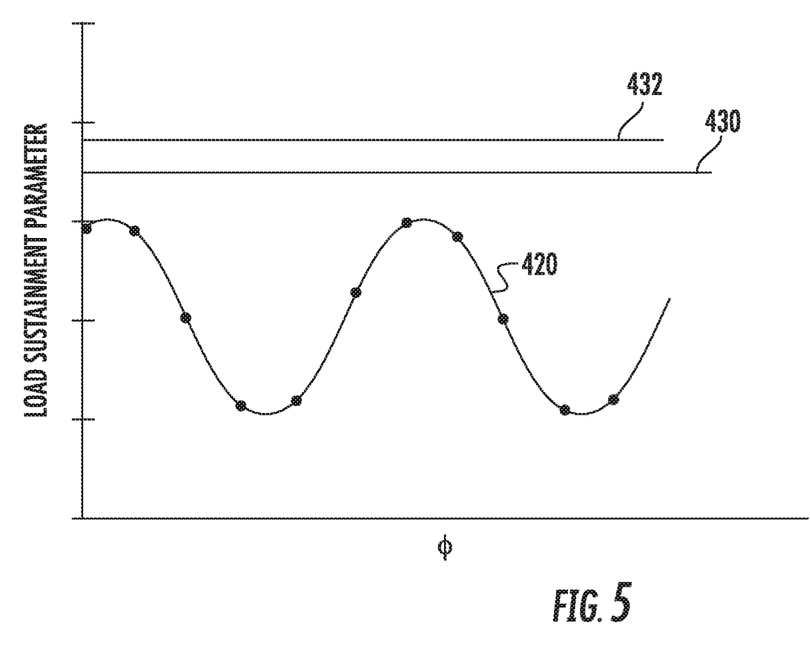
FIG. 5 depicts a graphical representation of an example load sustainment parameter determined for a plurality of circumferential sections of a wind turbine tower according to example embodiments of the present disclosure.

FIG. 5 depicts a graphical representation 420 of a load sustainment parameter calculated for a wind turbine tower according to example embodiments of the present disclosure. FIG. 5 plots circumferential location on the tower along the horizontal axis and the load sustainment parameter (e.g., represented as fatigue load) on the vertical axis. As shown, the load sustainment parameter varies as a function of circumferential location on the tower.

At (408), a wind turbine in the wind farm can be arranged based on the determined load sustainment parameter. In some embodiments, arranging the wind turbine in the wind farm based on the determined load sustainment parameter can include positioning the wind turbine at a particular location in the wind farm in a computer-implemented wind farm simulation tool for planning a wind farm. In some embodiments, arranging the wind turbine in the wind farm based on the determined load sustainment parameter can include orienting the wind turbine to a particular orientation in a computer-implemented wind farm simulation tool for planning a wind farm. In some embodiments, arranging the wind turbine in the wind farm based on the determined load sustainment parameter can include physically orienting the wind turbine and positioning the wind turbine in the wind farm when installing the wind turbine tower in the wind farm.

Optionally, in some embodiments, a maximum load sustainment parameter of the determined circumferential load sustainment parameters can be determined for the plurality of circumferential sections. For instance, the computing system 500 can determine a maximum load sustainment parameter of the determined load sustainment parameters for the plurality of circumferential sections. In an embodiment, the maximum load sustainment parameter of the determined load sustainment parameters for the plurality of circumferential sections of each of the cans can be determined. For instance, the computing system 500 can determine a maximum load sustainment parameter of the determined load sustainment parameters for the plurality of circumferential sections of each can.

The maximum load sustainment parameter can be compared to a limit. For instance, the computing system 500 can compare the maximum load sustainment parameter to a limit. When the maximum load sustainment parameter exceeds the limit, the wind turbine can be rearranged in the wind farm. Rearranging the wind turbine in the wind farm can include repositioning the wind turbine in the wind farm. Rearranging the wind turbine in the wind farm can include reorienting the wind turbine. Rearranging the wind turbine in the wind farm can include reorienting the wind turbine and repositioning the wind turbine in the wind farm.

As an example and referring to FIG. 5, curve 430 can represent a design limit for a load sustainment parameter for a wind turbine tower. Curve 432 can represent a calculated load sustainment parameter for a wind turbine tower without taking into account individual circumferential loads for each circumferential section of the wind turbine tower. As shown, curve 432 exceeds the limit represented by curve 430. As a result, calculating the load sustainment parameter for the tower without regard to circumferential breakdown of the load sustainment parameter can result in a determination that a position and/or orientation of the wind turbine tower is not suitable. However, curve 420 can represent a load sustainment parameter calculated for a plurality of different circumferential sections of the wind turbine tower. As illustrated, the load sustainment parameter for the plurality of circumferential sections does not exceed the limit represented by curve 430. In that regard, when analyzing the load sustainment parameter as a function of circumferential location about the tower, the position and/or orientation of the wind turbine tower may be determined to be suitable.

Other suitable design considerations can be made based at least in part on the load sustainment parameter determined for each of a plurality of different circumferential sections of a wind turbine tower according to example embodiments of the present disclosure. For example, additional reinforcement of the tower in certain circumferential locations can be determined based at least in part on the load sustainment parameters. In some embodiments, connection points and/or positions for connecting structures (e.g., bolts) for connecting circumferential sections of a tower together can be determined based at least in part on the load sustainment parameter determined for each of a plurality of different circumferential sections of a wind turbine tower. In some embodiments, turbine operation can be optimized (e.g., yaw positions of a turbine determined during operation) based at least in part on the load sustainment parameter determined for each of a plurality of different circumferential sections of a wind turbine tower. In some embodiments, circumferential placement of one or more structures such as a tower opening (such as a door opening), duct positions, tower foundation, etc. in the wind turbine tower can be determined based at least in part on the load sustainment parameter determined for each of a plurality of different circumferential sections of a wind turbine tower. Other suitable design considerations can be implemented based at least in part on the load sustainment parameter determined for each of a plurality of different circumferential sections of a wind turbine tower without deviating from the scope of the present disclosure.

In some embodiments, operation of a controller associated with the wind turbine can be adjusted based on the load sustainment parameter. For instance, in some embodiments, load sustainment parameters computed in real time during operation of a wind turbine in a wind farm can be used to adjust, for instance, a yaw position of the wind turbine to affect load sustainment on downstream wind turbine towers.

Figure 6:
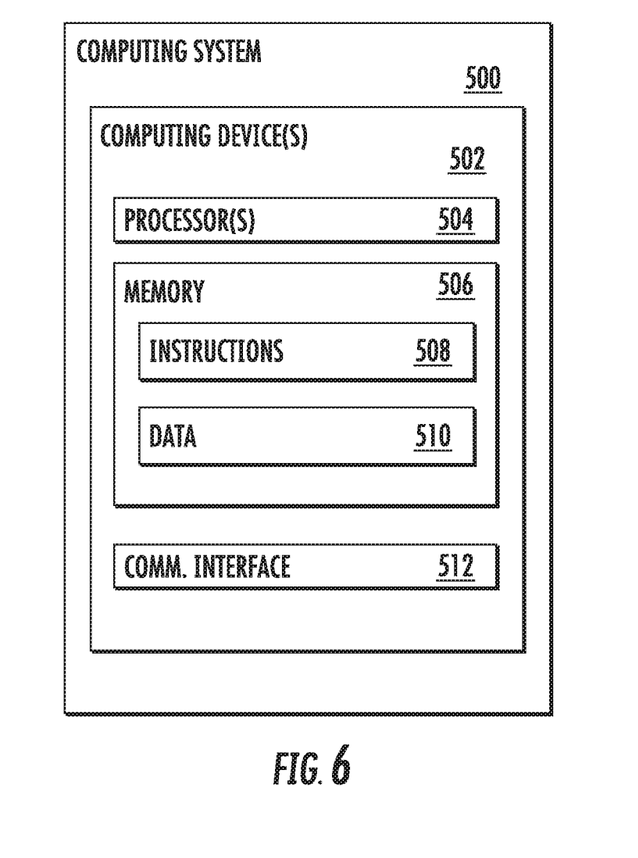
FIG. 6 depicts a computing system for implementing one or more aspects according to example embodiments of the present disclosure.

FIG. 6 depicts a block diagram of an example computing system 500 to implement methods and systems according to example embodiments of the present disclosure. As shown, the computing system 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as the operations for planning a wind farm, as described with reference to FIG. 4.

The memory device(s) 506 can further store data 510 that can be accessed by the processors 504. For example, the data 510 can include load data, wind data, wind condition data, load sustainment parameter data, tower circumferential data tower can data, etc., as described herein. The data 510 can include one or more table(s), function(s), algorithm(s), model(s), equation(s), etc. for planning a wind farm according to example embodiments of the present disclosure.

The one or more computing device(s) 502 can also include a communication interface 512 used to communicate, for example, with the other components of system. The communication interface 512 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for planning a wind farm comprising:
   determining, by one or more processors, a load for a plurality of wind conditions for a plurality of circumferential sections for a tower of a wind turbine;
   accessing, by the one or more processors, a model that predicts wind conditions over a time period;
   determining, by the one or more processors, a load sustainment parameter for each of the plurality of circumferential sections for the predicted wind conditions over the time period; and
   arranging the wind turbine in a wind farm based at least in part on the load sustainment parameter for each of the plurality of circumferential sections.

2. The method of claim 1, wherein arranging the wind turbine in the wind farm based on the determined load sustainment parameter comprises positioning or orienting the wind turbine tower in the wind farm.

3. The method of claim 1, wherein the method comprises determining a circumferential location of one or more structures of the wind turbine tower based at least in part on the load sustainment parameter for each circumferential section.

4. The method of claim 3, wherein the one or more structures comprise an opening for the wind turbine tower.

5. The method of claim 3, wherein the one or more structures comprise a connection point for connecting different circumferential sections of the wind turbine tower together.

6. The method of claim 1, further comprising:
   determining, by the one or more processors, a maximum load sustainment parameter of the determined load sustainment parameters for the plurality of circumferential sections; and
   comparing, by the one or more processors, the maximum load sustainment parameter to a limit.

7. The method of claim 6, wherein when the maximum load sustainment parameter exceeds the limit, the method comprises rearranging the wind turbine in the wind farm.

8. The method of claim 6, wherein rearranging the wind turbine in the wind farm comprises repositioning or reorienting the wind turbine tower in the wind farm in a computer-implemented wind farm planning tool.

9. The method of claim 6, wherein when the maximum load sustainment parameter exceeds the limit, the method comprises adjusting a circumferential location of one or more structures of the wind turbine tower based at least in part on the load sustainment parameter for each circumferential section.

10. The method of claim 9, wherein the one or more structures comprise an opening for the wind turbine tower.

11. The method of claim 9, wherein the one or more structures comprise a connection point for connecting different circumferential sections of the wind turbine tower together.

12. The method of claim 1, further comprising dividing, by the one or more processors, the wind turbine into a plurality of cans, wherein each can comprises at least one horizontal boundary, wherein determining the load sustainment parameter for the plurality of circumferential sections for the predicted wind conditions over the time period further comprises determining a load sustainment parameter for each circumferential section of each can.

13. The method of claim 1, wherein the method comprises adjusting operation of one or more controllers associated with the wind turbine based at least in part on the load sustainment parameter.

14. The method of claim 13, further comprising:
   determining, by the one or more processors, a maximum load sustainment parameter of the determined load sustainment parameters for the plurality of circumferential sections of each can;
   comparing, by the one or more processors, the maximum load sustainment parameter to a limit; and
   when the maximum load sustainment parameter exceeds the limit, rearranging, the wind turbine in the wind farm.

15. A system for planning a wind farm comprising:
   one or more memory devices; and
   one or more processors configured to:
      determine a load for a plurality of wind conditions for a plurality of circumferential sections for a plurality of wind directions for a tower of a wind turbine;
      access a model that predicts wind conditions over a time period;
      determine a load sustainment parameter for the plurality of circumferential sections for the predicted wind conditions over the time period; and
      arrange the wind turbine in a wind farm based at least in part on the load sustainment parameter for each of the plurality of circumferential sections.

16. The system of claim 15, wherein the one or more processors are further configured to divide the wind turbine into a plurality of cans, wherein each can comprises at least one horizontal boundary.

17. The system of claim 15, wherein the one or more processors are further configured to determine a load sustainment parameter for each circumferential section of each can.

18. The system of claim 15, wherein the one or more processors are further configured to:
- determine a maximum load sustainment parameter of the determined load sustainment parameters for the plurality of circumferential sections of each can;
- compare the maximum load sustainment parameter to a limit; and
- when the maximum load sustainment parameter exceeds the limit, rearrange the wind turbine in the wind farm.

19. The system of claim 15, wherein the one or more processors are further configured to rearrange the wind turbine in the wind farm in a computer-implemented wind farm planning tool.

* * * * *